US011948765B2

(12) United States Patent
Picot et al.

(10) Patent No.: US 11,948,765 B2
(45) Date of Patent: Apr. 2, 2024

(54) SWITCHING SYSTEM OF AN ELECTRICAL DEVICE

(71) Applicant: Schneider Electric Industries SAS, Rueil Malmaison (FR)

(72) Inventors: Philippe Picot, Meylan (FR); Mathieu Bono, Miribel Lanchâtre (FR); Stéphane Follic, Lumbin (FR); Philippe Schuster, Grenoble (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 17/695,888

(22) Filed: Mar. 16, 2022

(65) Prior Publication Data

US 2022/0310339 A1 Sep. 29, 2022

(30) Foreign Application Priority Data

Mar. 24, 2021 (FR) ...................................... 2102954

(51) Int. Cl.
*H01H 50/16* (2006.01)
*H01H 47/22* (2006.01)
*H01H 50/56* (2006.01)

(52) U.S. Cl.
CPC ............ *H01H 50/16* (2013.01); *H01H 47/22* (2013.01); *H01H 50/56* (2013.01)

(58) Field of Classification Search
CPC ........ H01H 50/16; H01H 47/22; H01H 50/56; H01H 1/54; H01H 3/28; H01H 33/38;
(Continued)

(56) References Cited

U.S. PATENT DOCUMENTS 8,581,135 B2 11/2013 Piccoz et al.
9,679,724 B2 * 6/2017 Abrahamsen ........ H01H 33/128
2010/0102035 A1 * 4/2010 Piccoz ............... H01H 33/6661 218/140

FOREIGN PATENT DOCUMENTS

DE 102013217834 A1 3/2015
EP 1580783 A1 9/2005
(Continued)

OTHER PUBLICATIONS

Machine translation of FR 3044162 A1 (Year: 2017).*
French Search Report and Written Opinion dated Dec. 13, 2021 for corresponding French Patent Application No. FR2102954, 8 pages.

*Primary Examiner* — Bernard Rojas
(74) *Attorney, Agent, or Firm* — Locke Lord LLP

(57) ABSTRACT

A switching system for switching an electrical device, comprising: a vacuum interrupter including a fixed electrode, and a mobile electrode, the mobile electrode configured to move between a closed position and an open position. The switching system further comprising an elastic return means configured to apply a driving force to the mobile electrode, and a retaining member for retaining the elastic return means, the retaining member configured to move from a retention configuration, in which the elastic return means is immobilized, into a movement configuration, in which the elastic return means is released. The switching system is configured so that the mobile electrode moves from the closed position to the open position under the action of the elastic return means when the retaining member leaves its retention configuration.

15 Claims, 7 Drawing Sheets

(58) Field of Classification Search
CPC .. H01H 31/003; H01H 33/6661; H01H 89/00; H01H 33/126; H01H 33/664
See application file for complete search history.

(56) References Cited

FOREIGN PATENT DOCUMENTS

| | | | |
|---|---|---|---|
| EP | 2182536 | A1 | 5/2010 |
| EP | 2436020 | A1 | 4/2012 |
| EP | 2479769 | A1 | 7/2012 |
| EP | 3046128 | A1 | 7/2016 |
| EP | 3046129 | A1 | 7/2016 |
| EP | 3567623 | A1 | 11/2019 |
| EP | 3699942 | A1 | 8/2020 |
| FR | 2972290 | A1 | 9/2012 |
| FR | 3044162 | A1 | 5/2017 |
| WO | 2006074975 | A1 | 7/2006 |
| WO | 2012146517 | A1 | 11/2012 |
| WO | 2013079381 | A1 | 6/2013 |
| WO | 2013110511 | A1 | 8/2013 |
| WO | 2014001029 | A1 | 1/2014 |
| WO | 2017011370 | A1 | 1/2017 |

* cited by examiner

SWITCHING SYSTEM OF AN ELECTRICAL DEVICE

TECHNICAL FIELD

The present invention relates to the field of medium-voltage vacuum interrupter switching devices which comprise components known as vacuum breakers or vacuum interrupters. Vacuum interrupters are used for example in medium-voltage, which is to say from 1 to 52 kV, electrical distribution devices. The vacuum interrupters are notably associated with actuators to switch off the current in part of an electric circuit.

PRIOR ART

Arranging a vacuum interrupter in a branch parallel to a main branch containing a main switch for one phase of an electrical device is known, notably from patent EP2182536. In such an architecture, no current passes through the vacuum interrupter during normal operation, which is to say when the main switch is closed so as to cause the current to circulate through the main branch. During the operation of opening of the main switch, a mobile part of the main switch closes the parallel branch containing the vacuum interrupter before the current in the main branch is interrupted. The current is then interrupted in the main branch, so that all of the current then passes through the vacuum interrupter. As it continues its opening travel, the mobile part of the main switch opens contacts of the vacuum interrupter and the current is switched off. This then avoids the creation of an electrical arc in the main switch, because the electrical current is passing only through the vacuum interrupter at the moment at which the current is switched off. Because the vacuum interrupter has electrical current passing through it only during transient phases of switching off the current, this breaker can be simplified and smaller in size in comparison with the vacuum interrupters generally intended to be placed in series with the main switch.

However, in that device, the opening of the vacuum interrupter is brought about solely by the main switch during the opening travel. The relative arrangement of the vacuum interrupter and of the main switch is therefore restricted. In addition, the kinematic connection between the vacuum interrupter and the main switch needs to be very precise. The dimensional tolerances on each element of the kinematic connection sequence need to be tight, given the number of elements involved in the assembly.

It is therefore desirable to have a solution that allows more options for the positioning of the vacuum interrupter with respect to the main switch and that is able to tolerate a lower level of precision in the creation of the moving parts that contribute to the opening of the vacuum interrupter.

SUMMARY

To this end, the invention proposes a switching system for switching an electrical device, comprising:

a vacuum interrupter comprising:

a fixed electrode, a mobile electrode, configured to move between:

a first position, known as the closed position, in which the fixed electrode and the mobile electrode are in contact with one another so as to allow electrical current to pass, and a second position, known as the open position, in which the fixed electrode and the mobile electrode are separated from one another so as to prevent electrical current from passing, an elastic return means configured to apply a driving force to the mobile electrode, a retaining member for maintaining the position of the elastic return means, the retaining member being configured to move:

from a first configuration, known as the retention configuration, in which the elastic return means is immobilized, into a second configuration, known as the movement configuration, in which the elastic return means is released, the switching system being configured so that the mobile electrode moves from the closed position to the open position under the action of the elastic return means when the retaining member leaves its retention configuration.

The opening of the vacuum interrupter requires only for the retaining member to leave its retention configuration. Once the configuration of the retaining member has been modified, the elastic return means is released, and the opening of the vacuum interrupter is brought about by the driving force of the elastic return means. Compared with the solutions according to the prior art, the vacuum interrupter can be sited more easily, because it is only the retaining member that needs to be moved in order to achieve the opening of the vacuum interrupter. The precision needed for obtaining the opening of the vacuum interrupter is also lower, because it is enough to make the retaining member move away from its initial configuration. In addition, the energy to be supplied in order to bring about the opening of the vacuum interrupter is lower, because this energy corresponds only to the energy needed to move the retaining member.

The features listed in the paragraphs which follow may be implemented independently of one another or in any technically feasible combinations:

The vacuum interrupter is mounted as a tapping off a main circuit of one phase of the electrical device.

The fixed electrode may comprise a rod extending along an axis and a contact body extending transversely with respect to the axis. The fixed electrode may be formed by a plate.

The mobile electrode comprises a rod extending along an axis.

The mobile electrode comprises a contact body extending transversely with respect to the axis. The contact body of the mobile electrode may be disc-shaped. The contact body of the mobile electrode may have a spherical shape. In that case, the fixed electrode is formed by a plate.

According to one embodiment, the switching system comprises a mobile cup able to move under the action of the elastic return means, the mobile electrode comprises a blade secured to the rod, and the mobile cup is configured to drive the blade.

The blade extends transversely with respect to the rod.

The cup is translationally mobile along the axis of the rod.

There is a clearance between the mobile cup and the blade when the retaining member is in the retention configuration retaining the elastic return means.

The presence of this clearance ensures that the mobile electrode and the fixed electrode are properly in contact, which is to say that the electrical contact is properly closed (made).

The elastic return means comprises a spring.

The elastic return means is a spring.

The elastic return means comprises a helical spring.

According to one embodiment of the switching system, in which the elastic return means comprises a spring, the spring is compressed between a fixed wall of the switching system and the mobile cup.

In a variant, the spring is mounted stretched between a fixed wall of the switching system and the mobile cup.

The helical spring is coaxial with the rod of the mobile electrode.

According to one embodiment of the switching system, the mobile cup comprises an orifice through which the rod of the mobile electrode passes.

According to one embodiment, the mobile cup is disc-shaped with an orifice at its centre. According to another embodiment, the mobile cup comprises a disc-shaped first portion and an annulus-shaped second portion, the first portion and the second portion extending transversely with respect to an axis, and a cylindrical third portion extending along the axis, the third portion connecting the first portion and the second portion, and the first portion comprises the orifice.

The fixed wall extends radially in a plane perpendicular to the axis of the rod of the mobile electrode.

A dimension of the orifice of the mobile cup is smaller than a dimension of the blade.

The spring bears against the second portion of the mobile cup.

According to one embodiment of the switching system, the retaining member is mounted with the ability to pivot about a pivot.

The axis of the pivot is perpendicular to the axis of the rod of the mobile electrode.

The retaining member comprises an elastic return means configured to keep the retaining member in the retention configuration.

According to one aspect of the invention, the switching system comprises a main switch of the electrical device, wherein the main switch is able to move between a first position allowing electrical current to pass in a main electric circuit and a second position preventing electrical current from passing in the main electric circuit, and the main switch is configured so that the retaining member leaves its retention configuration when the main switch moves from the first position allowing electrical current to pass to the second position preventing electrical current from passing. Because the opening of the vacuum interrupter is brought about by the elastic return means, the rate at which the vacuum interrupter opens is not dependent on the rate of actuation of the main switch. The behaviour of the switching system is thus more repeatable and easier to optimize.

According to one embodiment of the switching system, the retaining member is mounted with the ability to pivot, and the main switch of the main circuit is connected to a control element which comprises a thrust zone configured to press against the retaining member so as to cause the retaining member to pivot away from its retention configuration.

According to one embodiment, the retaining member is configured to move from the retention configuration to the movement configuration under the action of an electromagnet.

According to one embodiment of the invention, the switching system comprises a mobile magnetic element kinematically connected to the main switch of the main circuit, the magnetic element being configured to cause a magnetic flux to circulate in a control circuit controlling an electromagnet, the electromagnet being configured to cause the retaining member to move from the retention configuration to the movement configuration in response to a movement of the mobile magnetic element.

According to one embodiment, the mobile magnetic element is a permanent magnet.

According to an embodiment variant, the mobile magnetic element is a magnetic core.

The mobile magnetic core may be a metal rod. The mobile magnetic core may be made of soft iron.

The retaining member comprises a magnetic element which is attracted by the magnetic field created by the electromagnet.

The control circuit comprises a fixed magnetic core, an induction coil surrounding the fixed magnetic core, and comprises a mobile permanent magnet.

The control circuit comprises a fixed magnetic core, an induction coil surrounding the fixed magnetic core, and comprises a mobile magnetic core.

According to one embodiment of the switching system, the main switch of the main circuit is configured to electrically power a control circuit controlling the electromagnet, the electromagnet being configured to cause the retaining member to move from the retention configuration to the movement configuration in response to the supply of electrical power received from the main switch.

According to one embodiment, the control circuit controlling the electromagnet is electrically powered by the main circuit of the electrical device.

According to one embodiment of the switching system, the retaining member comprises a permanent magnet configured to apply a magnetic force to a magnetic blade connected to the mobile electrode.

The retaining member comprises an electromagnet configured to apply a magnetic field opposite to a magnetic field generated by the permanent magnet.

According to one embodiment of the switching system, the retaining member is translationally mobile.

The retaining member is, for example, able to move in translation in a direction perpendicular to the axis of the rod of the mobile electrode of the vacuum interrupter.

According to another aspect of the invention, the main switch is configured to cause the mobile electrode to move into the position in which the vacuum interrupter is closed, is also configured to cause the elastic return means to move into a position in which the potential energy of the elastic return means is greater than or equal to the potential energy corresponding to the retention configuration, and is also configured to move the retaining member into its retention configuration when the main switch moves from the position preventing the current from passing in the main circuit to the position that allows the current to pass in the main circuit. In other words, the switching system is reset by an operation of closing the main switch. What that means to say is that the various components and units of the switching system return to their initial configuration when the main switch is operated with a view to closing the circuit in order to allow current to pass.

The switching system comprises a pivoting link rod configured to cause the elastic return means to move into a position in which the potential energy of the elastic return means is greater than or equal to the potential energy corresponding to the retention configuration when the main switch moves from the position preventing current from passing in the main circuit to the position allowing current to pass in the main circuit.

The invention also relates to an electrical device comprising:

a main switch of a main circuit, a switching system as described hereinabove, wherein the vacuum interrupter is arranged in parallel with the main switch.

BRIEF DESCRIPTION OF THE DRAWINGS

Further features, details and advantages will become apparent from reading the following detailed description and from studying the attached drawings in which.

DESCRIPTION OF THE EMBODIMENTS

To make the figures easier to read, the various elements are not necessarily drawn to scale. In these figures, identical elements bear the same references. Certain elements or parameters may be indexed, which is to say designated for example as first element or second element, or else first parameter and second parameter, etc. This indexing is intended to differentiate elements or parameters that are similar but not identical. This indexing does not imply that one element or parameter takes priority over another, and the denominations are interchangeable. Where it is specified that a subsystem comprises a given element, that does not exclude there being other elements present in that subsystem.

Figure 1:
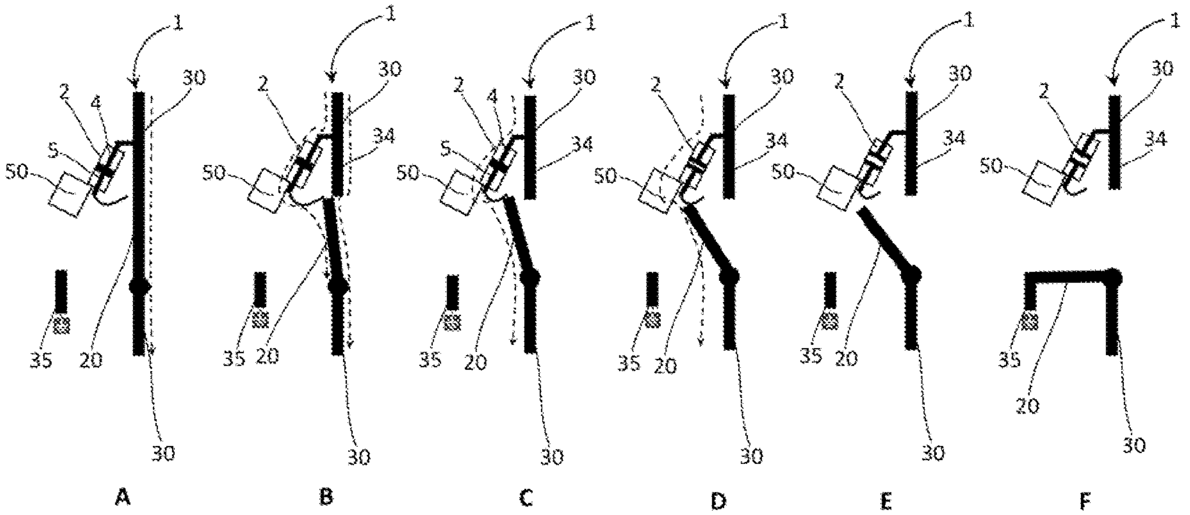
FIG. 1 is a schematic depiction of an electrical device comprising a switching system comprising a vacuum interrupter.

FIG. 1 depicts an electrical device 1 comprising:

a main switch 20 of a main circuit 30, a vacuum interrupter 2, arranged in parallel with the main switch 20.

FIG. 1 does not depict in detail the switching system for switching the electrical device 1.

Figure 2:
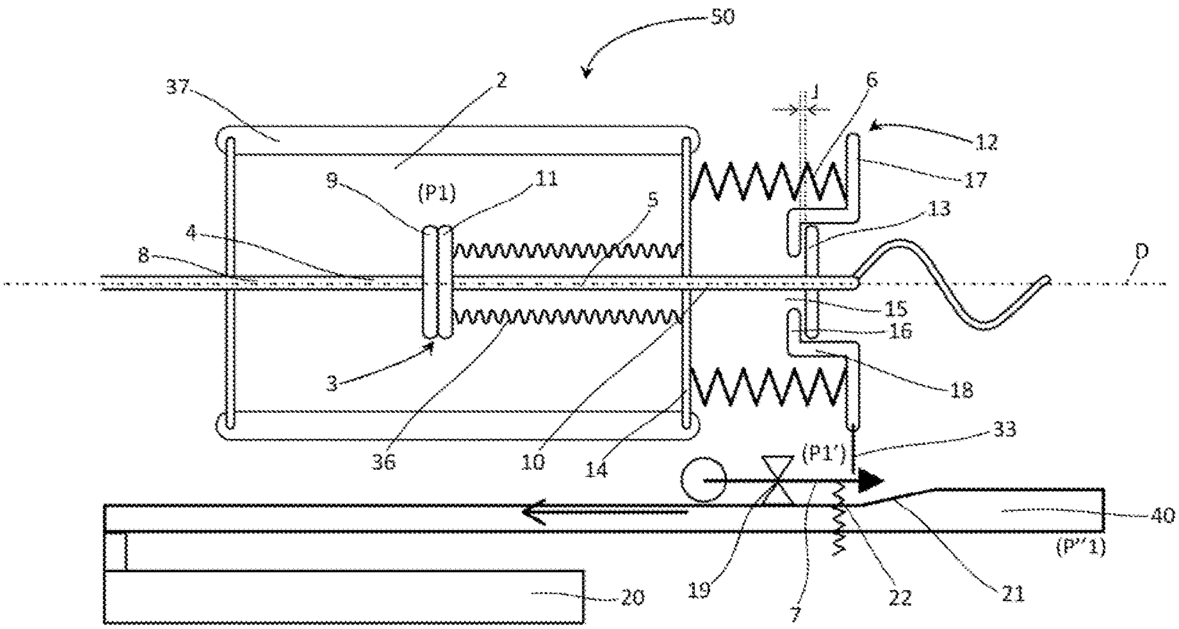
FIG. 2 is a partial schematic depiction of a first embodiment of the invention, the vacuum interrupter being in the closed position.
Figure 3:
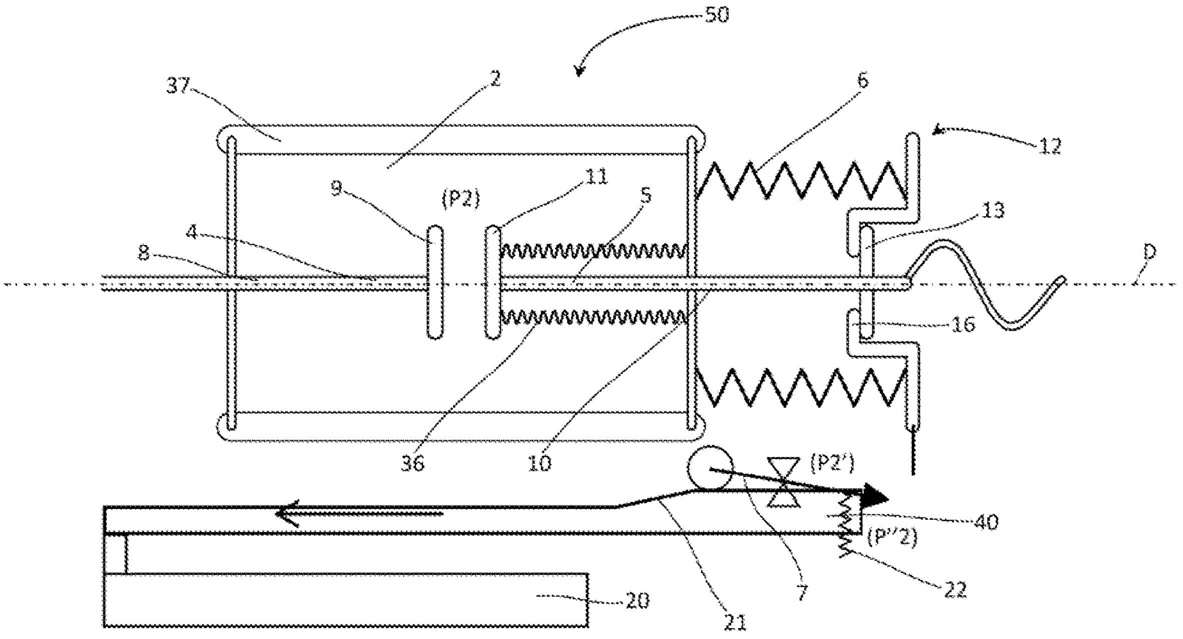
FIG. 3 is a partial schematic depiction of the first embodiment of the invention, the vacuum interrupter being in the open position.

The vacuum interrupter 2 is mounted as a tapping off the main circuit 30 of one phase of the electrical device 1. As illustrated notably in FIG. 2, the vacuum interrupter 2 comprises a fixed electrode 4 and a mobile electrode 5. The mobile electrode 5 is configured to move between a first position P1 known as the closed position, in which the fixed electrode 4 and the mobile electrode 5 are in contact with one another so as to allow an electrical current to pass, and a second position P2 known as the open position, in which the fixed electrode 4 and the mobile electrode 5 are separated from one another so as to prevent electrical current from passing. The fixed electrode 4 and the mobile electrode 5 form an electric contact 3. Electric current can pass through the contact 3 when the fixed electrode 4 and the mobile electrode 5 are pressed against one another, as illustrated in FIG. 2. The current in the contact 3 is interrupted when the mobile electrode 5 and the fixed electrode 4 are moved away from one another, as illustrated in FIG. 3.

The vacuum interrupter 2 is provided for medium-voltage, which is to say a voltage of between 1 kV and 52 kV, electrical equipment. The electrical device 1 may for example be a switch. The vacuum interrupter 2 comprises a housing 37 forming a sealed vacuum chamber. What that means is that the pressure prevailing inside the chamber is below $10^{-4}$ millibar. A bellows 36 allows the mobile electrode 5 to move while maintaining the fluid tightness of the vacuum interrupter 2 with respect to the outside.

As illustrated in FIG. 1, the main circuit 30 comprises a fixed contact 34. The electrical device 1 also comprises an earthing contact 35. The switch 20 is mobile in rotation between a nominal position for the circulation of electric current in the main circuit 30, illustrated as A in FIG. 1, and a position in which the switch 20 is connected to the earthing contact 35, illustrated as F.

FIG. 1 schematically describes the successive steps of an operation of opening (breaking) the main circuit 30. Steps A to F are in chronological order. The broken lines ending in an arrow indicate the passage of the current. In B, the main switch 20 has initiated a rotational movement. Electrical contact between the switch 20 and the fixed contact 34 is still established, because of the width of the zones that are in contact. Electrical contact between the main switch 20 and the vacuum interrupter 2 is also achieved. An electrical current circulates simultaneously through the fixed contact 34 and, in parallel, through the vacuum interrupter 2. In C, the main switch 20 has continued its rotational movement and is no longer in contact with the fixed contact 34. The main switch 20 is in contact with the vacuum interrupter 2. All of the current passes through the vacuum interrupter 2. The contact 3 of the vacuum interrupter is closed, which is to say that the fixed electrode 4 and the mobile electrode 5 are in contact. In D, the main switch 20 has triggered the opening of the contact 3, which is to say that the mobile electrode 5 has begun to move away from the fixed electrode 4. The switching system 50 that allows the contact 3 of the vacuum interrupter 2 to be opened will be described in detail in the paragraphs which follow. The current passes through the vacuum interrupter 2 in the form of an electric arc when the contact opens. In E, the separation between the mobile electrode 5 and the fixed electrode 4 is at a maximum. Shortly after the phase current passes through zero, the current in the vacuum interrupter 2 is switched off. The current in the main circuit 30 is thus switched off. In F, the main switch 20 has completed its rotational movement and is in contact with the earthing contact 35.

The switching system for switching the electrical device 1 will now be described.

The switching system 50 for switching an electrical device 1 comprises:

- a vacuum interrupter 2 comprising:
  - a fixed electrode 4,
  - a mobile electrode 5, configured to move between:
- a first position P1, known as the closed position, in which the fixed electrode 4 and the mobile electrode 5 are in contact with one another so as to allow electrical current to pass, and
- a second position P2, known as the open position, in which the fixed electrode 4 and the mobile electrode 5 are separated from one another so as to prevent electrical current from passing,
- an elastic return means 6 configured to apply a driving force to the mobile electrode 5,
- a retaining member 7 for maintaining the position of the elastic return means 6, the retaining member 7 being configured to move:
- from a first configuration P1', known as the retention configuration, in which the elastic return means 6 is immobilized, into
- a second configuration P2', known as the movement configuration, in which the elastic return means 6 is released, the switching system 50 being configured so that the mobile electrode 5 moves from the closed position P1 to the open position P2 under the action of the elastic return means 6 when the retaining member 7 leaves its retention configuration P1'.

The opening of the vacuum interrupter 2 requires only for the retaining member 7 to be moved away from its retention configuration P1'. Once the retaining member 7 has been released, the opening of the vacuum interrupter 2 is brought about by the elastic return means 6. In other words, the mechanical energy needed for achieving the opening of the vacuum interrupter 2 is provided by the elastic return means 6. The energy to be provided in order to bring about the opening of the vacuum interrupter 2 is lower because this energy corresponds only to the energy required to move the retaining member. In addition, the precision needed to achieve the opening of the vacuum interrupter is lower because all that is required is to move the retaining member. The geometric tolerances on each element of the mechanism can therefore be higher than in the solutions according to the prior art. In addition, the vacuum interrupter can more easily be positioned in various ways, which is attractive in order to suit different applications. The retention configuration P1' may be a position of retention of the retaining member 7. Such is the case when the retaining member 7 is a mechanical retaining system. The retention configuration P1' may be an electrical or magnetic configuration of the retaining member 7. Such is the case when the retaining member 7 is a magnetic retaining system.

The elastic return means 6 comprises a spring. In the example illustrated, the elastic return means 6 is a spring. More specifically, the elastic return means 6 comprises a helical spring. Other return means may also be envisaged.

In the embodiment of the switching system 50 that is illustrated notably in FIGS. 2 and 3, the spring 6 is compressed between a fixed wall 14 of the switching system 50 and a mobile cup 12. That means that the spring 6 is compressed with respect to its free state, which is to say the state in which no external stress is applied between the ends of the spring 6. The spring 6 is mounted with an adjusted preload so as to provide enough driving force to cause the mobile electrode 5 to move.

The elastic return means 6 is in a state of maximum potential energy when the elastic return means 6 is in the position of immobilization. When the elastic return means 6 is in this position, the retaining member 7 is in the retention configuration P1'. The contact 3 is then in the closed position P1 and allows current to pass through the vacuum interrupter 2. FIG. 2 corresponds to this state of the actuating device 50. In the various figures, the reference of the position of a mobile element is indicated between parentheses.

The fixed electrode 4 comprises, in the example illustrated, a rod 8 extending along an axis D and a contact body 9 extending transversely with respect to the axis D. The mobile electrode 5 comprises a rod 10 extending along an axis D. The mobile electrode 5 also comprises a contact body 11 extending transversely with respect to the axis D. The fixed electrode 4 and the mobile electrode 5 are coaxial. The mobile electrode 5 is able to move translationally along the axis D of the rod 10. The helical spring 6 is coaxial with the rod 10 of the mobile electrode 5.

According to the embodiment depicted in FIGS. 2 and 3, the switching system comprises a mobile cup 12 able to move under the action of the elastic return means 6, the mobile electrode 5 comprises a blade 13 secured to the rod 10, and the mobile cup 12 is configured to drive the blade 13.

The mobile cup 12 may drive the blade 13 under the action of the elastic return means 6. The blade 13 extends transversely with respect to the rod 10. The cup 12 is able to move translationally along the axis D of the rod 10. There is a clearance J between the mobile cup 12 and the blade 13 when the retaining member 7 is in the retention configuration P1' for retaining the elastic return means 6.

This axial clearance J ensures that the mobile electrode 5 and the fixed electrode 4 are properly in contact, which is to say that the electric contact is properly closed (made), when the elastic return means 6 is retained by the retaining member 7. The sealing bellows 36 which surrounds the mobile electrode 5 provides a return force which presses the mobile electrode 5 against the fixed electrode 4. An additional spring, not depicted, may be positioned inside the bellows 36 to increase the contact force.

FIG. 3 illustrates the contact 3 in the open position. The retaining member 7 is distanced from its retention configuration P1' and is in a configuration P2' in which the elastic return means 6 is released. The elastic return means 6 is thus free to move. The elastic return means is thus relaxed. The cup 12 has been moved by the spring 6 and has driven the mobile electrode 5 via the blade 13. The blade 13 is bearing without clearance against the cup 12. FIG. 2 and FIG. 3 illustrate the extreme positions adopted by the various components. The positions that are intermediate between these two extreme positions have not been depicted.

According to the embodiment of the switching system that is illustrated in FIG. 2 and FIG. 3, the mobile cup 12 comprises an orifice 15 through which the rod 10 of the mobile electrode 5 passes. The mobile cup 12 comprises a disc-shaped first portion 16, and an annulus-shaped second portion 17, the first portion 16 and the second portion 17 extending transversely with respect to an axis D, and a cylindrical third portion 18 extending along the axis D, the third portion 18 connecting the first portion 16 and the second portion 17, and the first portion 16 comprises the orifice 15.

The fixed wall 14 extends radially in a plane perpendicular to the axis D of the rod 10 of the mobile electrode 5. A dimension of the orifice 15 of the mobile cup 12 is smaller than a dimension of the blade 13. Thus, the blade 13 can be driven by the mobile cup 12. The orifice 15 is, for example, circular. The blade 13 is, for example, disc-shaped. The spring 16 bears against the second portion 17 of the mobile cup 12. The retaining member 7 is mounted with the ability to pivot about a pivot 19. The axis of the pivot 19 is perpendicular to the axis D of the rod 10 of the mobile electrode 5. The retaining member 7 may take the form of a hook able to bear against the periphery 33 of the cup 12. The retaining member 7 comprises an elastic return means 22 configured to keep the retaining member 7 in the retention configuration P1'.

According to a variant which has not been depicted, the spring 6 is mounted stretched between a fixed wall 14 of the switching system 50 and the mobile cup 12. In other words, the spring then works in extension rather than in compression. As previously, it must be appreciated that the spring 6 is then extended in relation to its free state, namely the state in which no stress is applied between its ends.

As indicated schematically in FIGS. 2 and 3 in particular, the switching system 50 comprises a main switch 20 of the electrical device 1. The main switch 20 is able to move between a first position P1" allowing electrical current to pass in a main electric circuit 30, and a second position P2" preventing electrical current from passing in the main electric circuit 30. The main switch 20 is configured so that the retaining member 7 leaves its retention configuration P1' when the main switch 20 moves from the first position P1" allowing electrical current to pass into the second position P2" that prevents electrical current from passing. The rate at which the vacuum interrupter 2 opens is independent of the rate at which the main switch 20 opens because the opening of the vacuum interrupter 2 is brought about by the elastic return means 6. The kinematic sequence of the switching system as a whole is thus facilitated.

According to the embodiment illustrated in FIG. 2 and FIG. 3, the retaining member 7 is mounted with the ability to pivot and the main switch 20 of the main circuit 30 is connected to a control element 40 which comprises a thrust zone 21 configured to press against the retaining member 7 so as to cause the retaining member 7 to pivot away from its retention configuration P1'. The retention configuration P1' thus corresponds to a retention position of the retaining member 7.

In this embodiment, the retaining member 7 leaves its retention configuration P1' in which it retains the elastic return means 6 under the effect of the mechanical contact with the control element 40, connected to the main switch 20, during the opening travel of the main circuit 30. The thrust zone 21 moves a portion of the retaining member 7 in the manner of a cam.

In other words, the movement of the main switch 20 allows the retaining member 7 to be pushed back and made to leave its retention configuration P1'. The spring 6 is thus released, and moves the blade 12 which drives with it the mobile electrode 5. The mechanical connection between the main switch 20 and the retaining member 7 may tolerate far looser dimensional tolerances than the solutions according to the prior art, because all that is needed is for the retaining member 7 to be moved away from its retention configuration P1'.

FIGS. 4 to 8 illustrate embodiments in which the movement of the retaining member 7 is brought about in a different way.

In these embodiments, the retaining member 7 is configured to pass from the retention configuration P1' to the movement configuration P2' under the action of an electromagnet 25.

Figure 4:
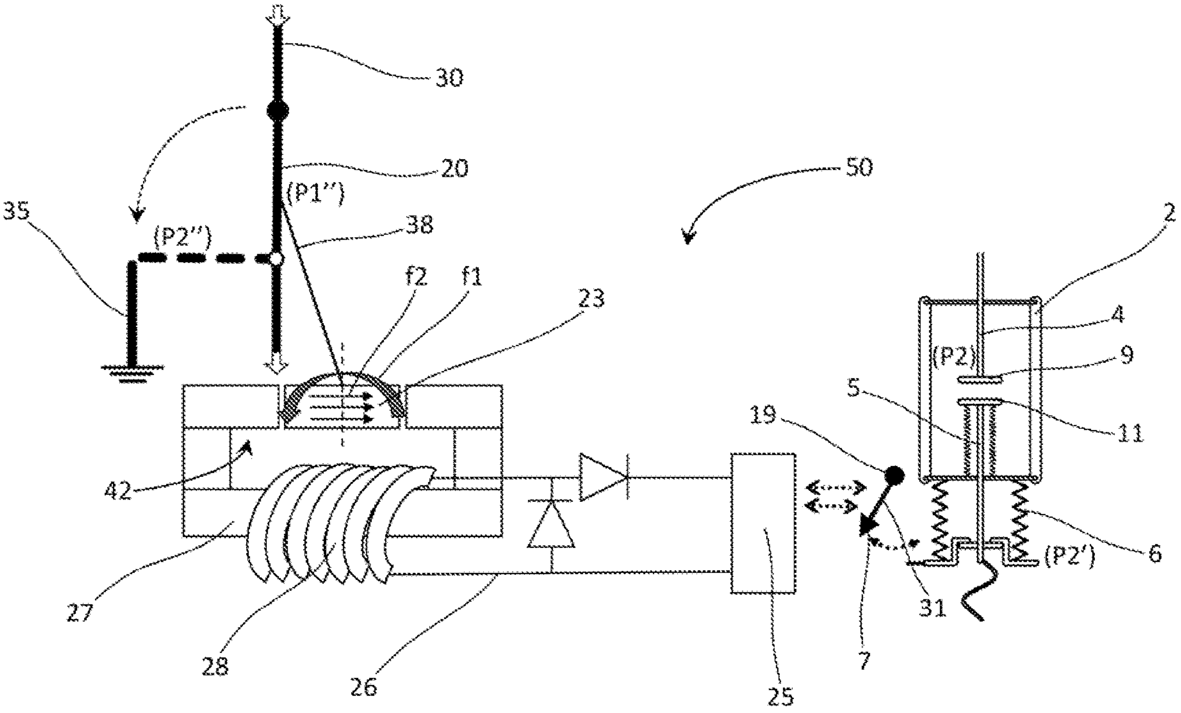
FIG. 4 is a partial schematic depiction of a second embodiment of the invention.

According to the second embodiment illustrated in FIG. 4, the switching system 50 comprises a mobile magnetic element 23 kinematically connected to the main switch 20 of the main circuit 30. The magnetic element 23 is configured to cause a magnetic flux to circulate in a control circuit 26 controlling an electromagnet 25, the electromagnet 25 being configured to make the retaining member 7 move from the retention configuration P1' to the movement configuration P2' in response to a movement of the mobile magnetic element 23. The element 38 provides the connection between the main switch 20 and the mobile magnetic element 23.

The mobile magnetic element 23 thus forms part of a magnetic circuit 42. In other words, the mobile magnetic element 23 has magnetic field lines passing through it. The mobile magnetic element 23 contributes to closing the circuit of the magnetic field lines in the magnetic circuit 42. Thus, the magnetic flux in the magnetic circuit 42 varies according to the position of the mobile magnetic element 23. A movement of the mobile magnetic element 23, for example a rotation, thus allows the magnetic flux in the inductor 28 to be varied. This inductor 28 placed in the control circuit 26 is able to generate an electric voltage and thereby an electric current able to control the electromagnet 25. Controlled operation of the electromagnet 25 causes the retaining member 7 to move away from the retention configuration P1'. In other words, the retaining member 7 leaves its retention configuration when the electromagnet 25 is operated. In FIG. 4, the arrow f1 schematically indicates the pivoting movement of the mobile magnetic element 23, and the arrows f2 schematically indicate the magnetic field lines in the magnetic element 23.

In this embodiment, control of the electromagnet 25 does not call for an external electrical power supply. Some of the mechanical energy of the movement of the main switch 20 is converted into electrical energy and can be used to control the electromagnet 25 allowing the retaining member 7, and thereby the elastic return means 6, to be released. The magnetic properties of the mobile magnetic element, of the other components of the magnetic circuit and the electrical properties of the elements of the control circuit, such as the inductance, are chosen in such a way as to obtain a voltage and an electrical current of sufficient amplitude and duration.

According to the embodiment illustrated in FIG. 4, the mobile magnetic element 23 is a permanent magnet. In this example, the control circuit 26 comprises a fixed magnetic core 27, an induction coil 28 surrounding the fixed magnetic core 27, and comprises a mobile permanent magnet 23.

The retaining member 7 comprises a magnetic element 31 which is attracted by the magnetic field created by the electromagnet 25.

Once the retaining member 7 has moved away from the retention configuration P1', separation of the mobile electrode 5 and of the fixed electrode 4, under the action of the elastic return means 6, occurs in the same way as in the first embodiment.

According to an embodiment variant which has not been depicted, the mobile magnetic element 23 may be made of soft iron. In that case, the magnetic circuit 42 also comprises a fixed permanent magnet. The control circuit 26 may thus in this case comprise a fixed magnetic core 27, an induction coil 28 surrounding the fixed magnetic core 27, and comprises a mobile magnetic core 23.

FIGS. 5 to 8 relate to embodiments which differ from the second embodiment in terms of the way in which the electromagnet 25 is controlled.

According to these embodiments of the switching system, the main switch 20 of the main circuit 30 is configured to electrically power a control circuit 26 controlling the electromagnet 25, the electromagnet 25 being configured to cause the retaining member 7 to move from the retention configuration into the movement configuration in response to the electrical power supply received from the main switch 20.

In the example of FIGS. 5 to 8, the control circuit 26 controlling the electromagnet 25 is electrically powered by the main circuit 30 of the electrical device 1.

For that, the main switch 20 comprises an electrical connection zone 29 providing electrical contact between the control circuit 26 and the main circuit 30 when the main switch 20 is in an intermediate position somewhere between a nominal position for the circulation of current in the main circuit, and an open position P2" in which the main circuit is open. In other words, the main switch 20 closes the electrical power supply circuit of the control circuit 26.

A voltage of the electromagnet power supply electrical circuit is for example below 20 V so as to ensure proper transfer of current into the branch consisting of the control circuit 26 and the vacuum interrupter 2.

Figure 5:
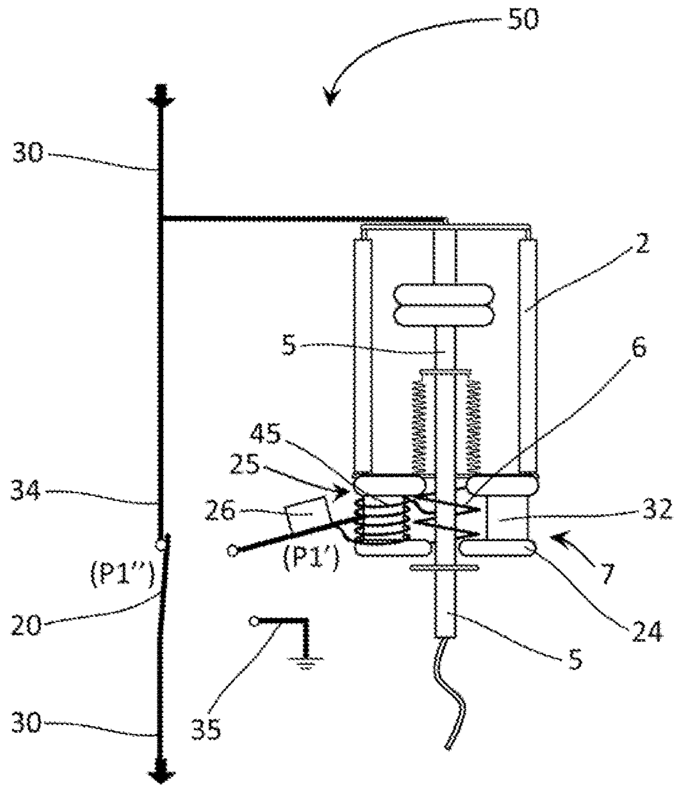
FIG. 5 is a partial schematic depiction of a third embodiment of the invention, with the vacuum interrupter in the closed position.
Figure 6:
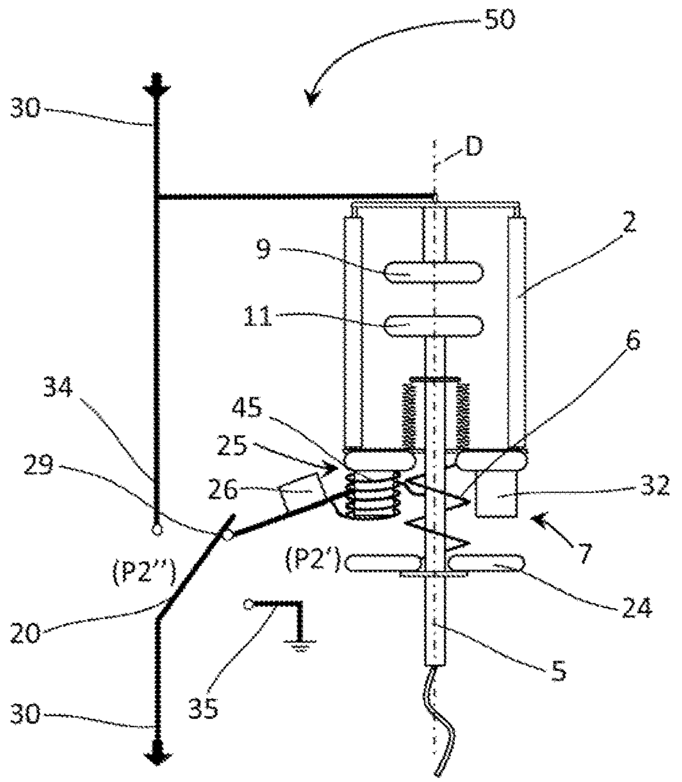
FIG. 6 is a partial schematic depiction of the third embodiment of the invention, with the vacuum interrupter in the open position.

In the embodiment of the switching system 50 that is illustrated in FIGS. 5 and 6, the retaining member 7 comprises a permanent magnet 32 configured to apply a magnetic force to a mobile magnetic frame 24 connected to the mobile electrode 5. The retaining member 7 comprises an electromagnet 25 configured to apply a magnetic field opposite to a magnetic field generated by the permanent magnet 32. The electromagnet 25 comprises a coil 45 that can be controlled by the control circuit 26. When the electromagnet 25 is controlled, it generates a magnetic field that opposes the one created by the permanent magnet 32. The retention force of the magnet 32 is cancelled. The elastic return means 6 is therefore able to supply the force necessary to separate the mobile electrode 5 and the fixed electrode 4.

In other words, part of the retaining member 7 in this case is connected to the mobile electrode 5. More specifically, the mobile magnetic frame 24 is secured to the mobile electrode 5. Part of the retaining member 7 is connected to the vacuum interrupter 2. More specifically, the electromagnet 25 is connected to the vacuum interrupter 2.

In this embodiment, the retaining member 7 is translationally mobile. The direction of the translation is the axis D of the rod 10 of the mobile electrode 5.

Figure 7:
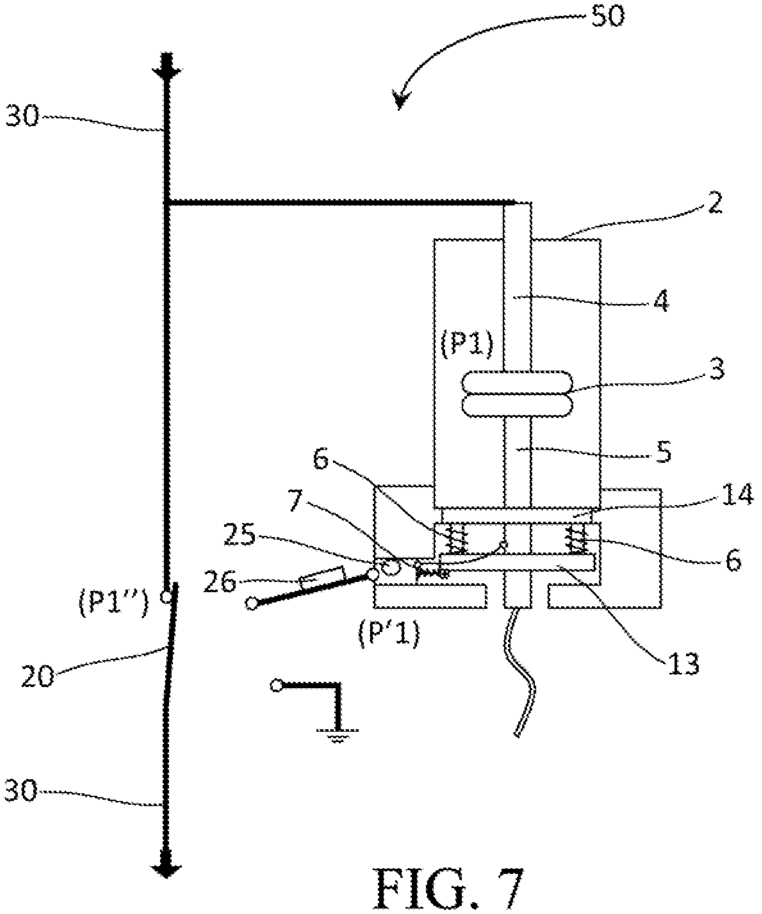
FIG. 7 is a partial schematic depiction of a fourth embodiment of the invention, the vacuum interrupter being in the closed position.
Figure 8:
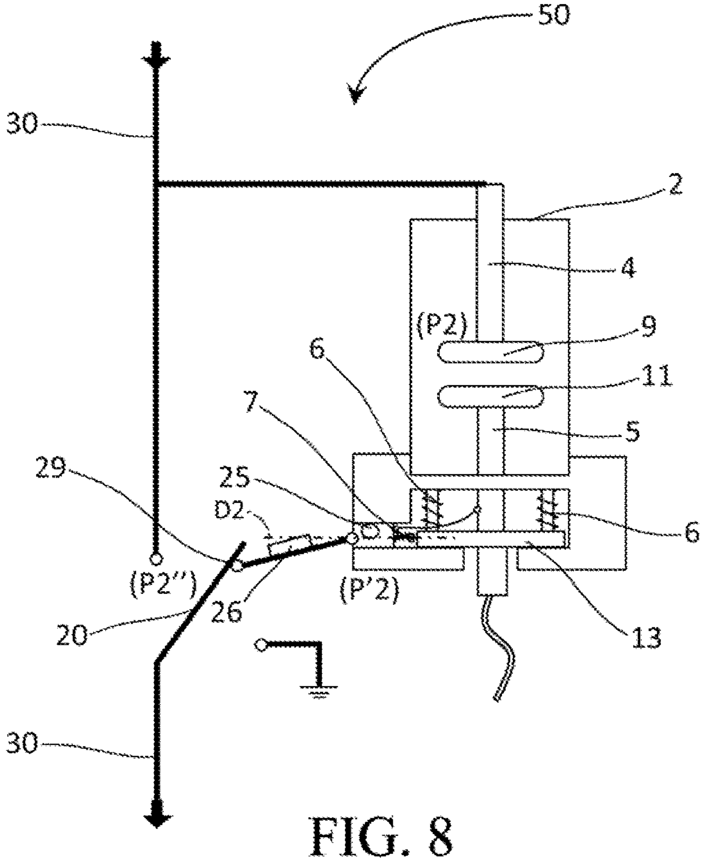
FIG. 8 is a partial schematic depiction of the fourth embodiment of the invention, the vacuum interrupter being in the open position.

FIGS. 7 and 8 illustrate a fourth embodiment. In this embodiment, the retaining member 7 is translationally mobile in a direction D2 perpendicular to the axis D of the rod 10 of the mobile electrode 5 of the vacuum interrupter 2.

Figure 9:
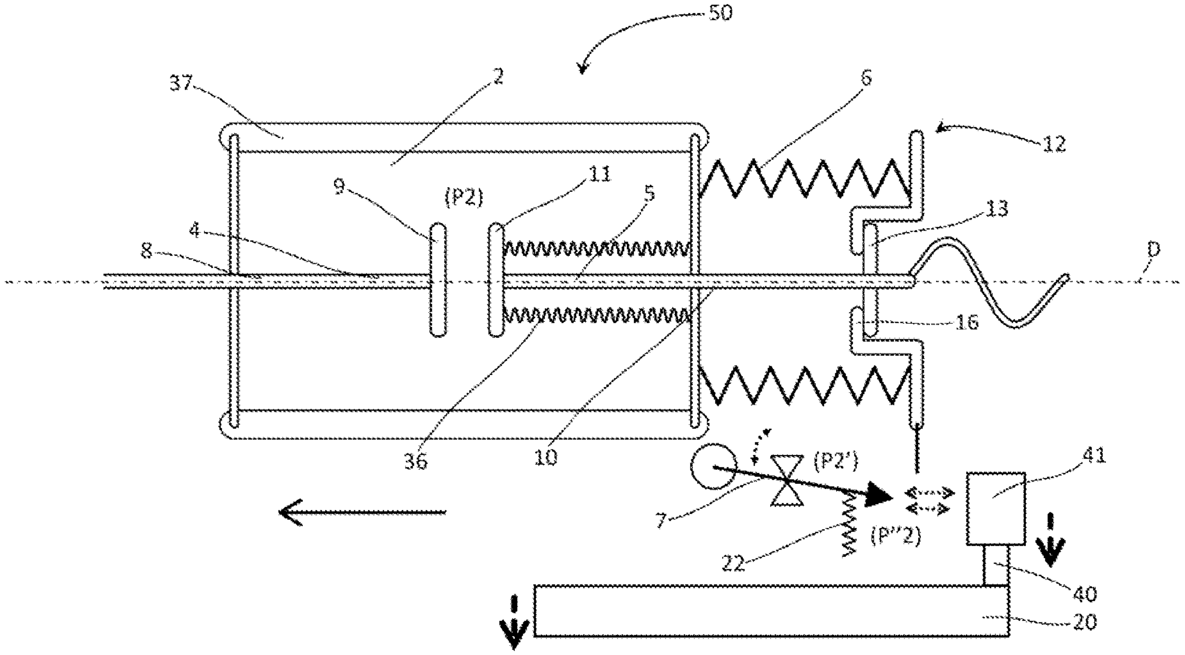
FIG. 9 is a partial schematic depiction of a fifth embodiment of the invention, with the vacuum interrupter in the open position.
Figure 10:
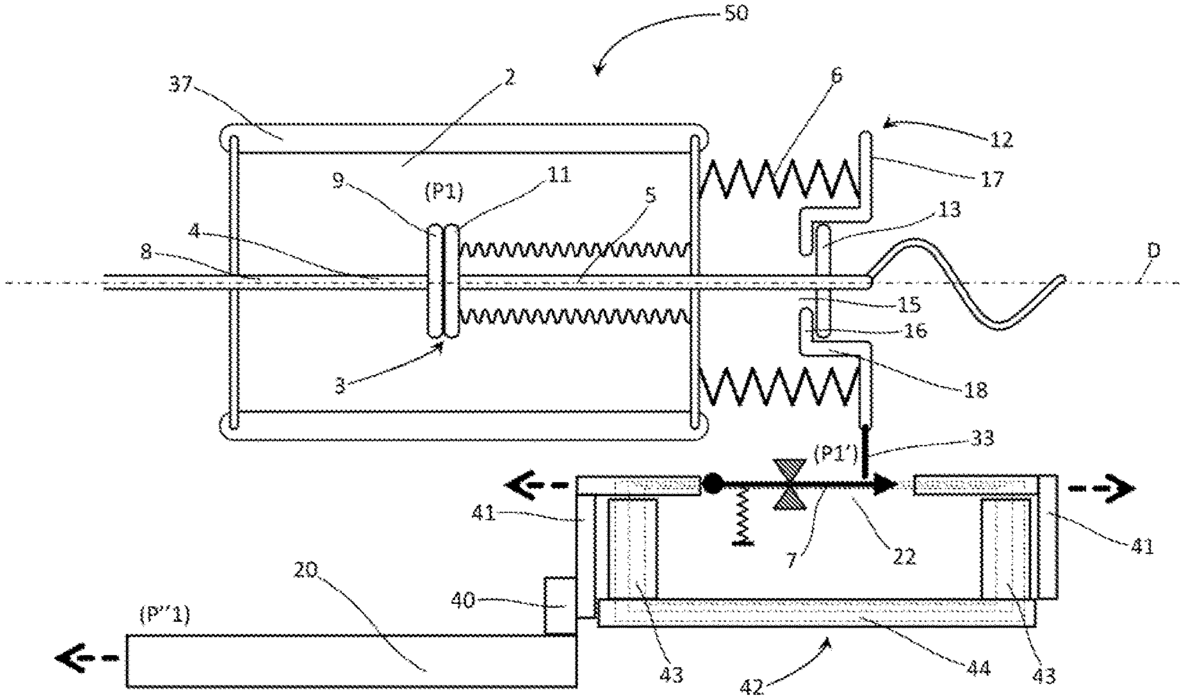
FIG. 10 is a partial schematic depiction of a sixth embodiment of the invention, the vacuum interrupter being in the closed position.
Figure 11:
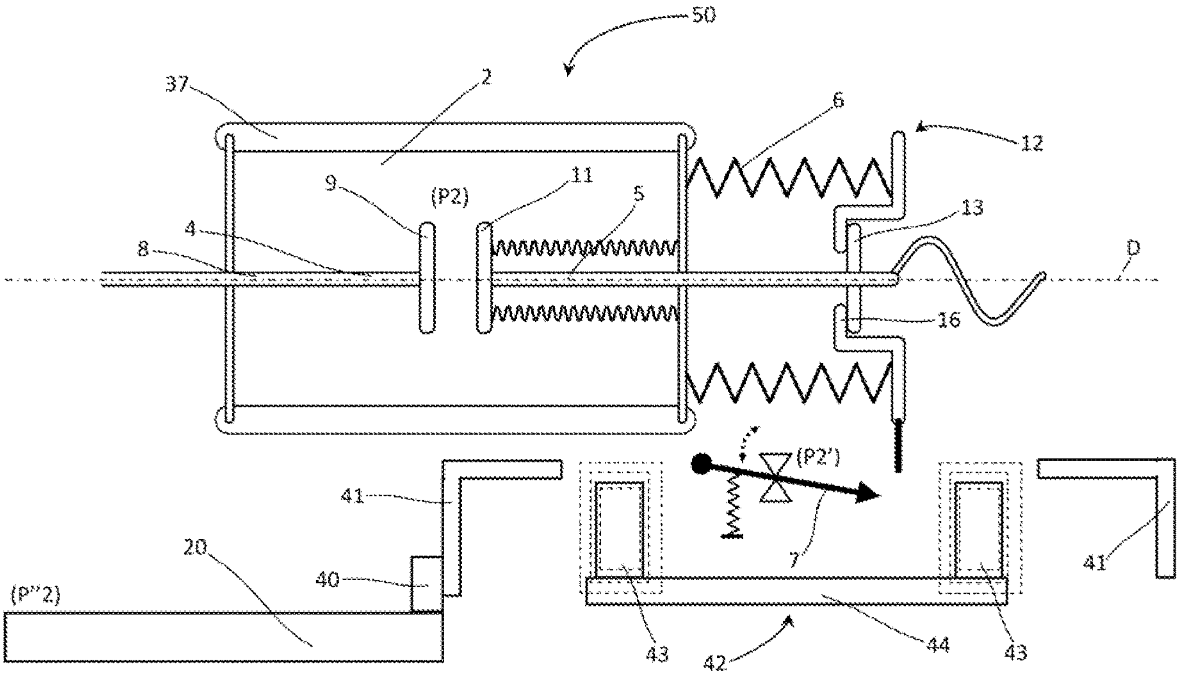
FIG. 11 is a partial schematic depiction of a sixth embodiment of the invention, the vacuum interrupter being in the open position.

FIGS. 9 to 11 illustrate a fifth and a sixth embodiment. In these embodiments, the retaining member 7 is configured to move from the retention configuration P1' to the movement configuration P2' under the action of a magnetic component 41 connected to the main switch 20. In other words, the main switch 20 is kinematically connected to the magnetic component 41, which is to say that the main switch 20 can drive the magnetic component 41 during the movement from the position P1" to the position P2".

In the fifth embodiment illustrated in FIG. 9, the magnetic component 41 is a permanent magnet configured to drive the retaining member 7. Thus, the movement of opening of the main switch 20 moves the permanent magnet 41, which attracts the retaining member 7. The retaining member 7 is thus moved from the retention configuration P1', which in this instance is a position of retention, to the movement configuration P2', which in this instance is a movement position. The spring 6 brings about the opening of the vacuum interrupter 2.

In the sixth embodiment, the magnetic component 41 is a magnetic core configured to channel a magnetic field in a magnetic circuit 42. The magnetic circuit 42 comprises two permanent magnets 43 and a magnetic core 44. The magnetic component 41 comprises two parts. The broken lines schematically illustrate the closing of the circuit of the field lines in the magnetic circuit 42. In FIG. 10, the field lines pass through the two parts of the magnetic component 41 and through the retaining member 7. The retaining member 7 orients itself under the effect of the magnetic field lines and is thus kept in position. The retaining member 7 is thus in the retention configuration P1'.

In FIG. 11, the magnetic component 41 has been moved. The two parts of the magnetic component 41 are distanced from the other components of the magnetic circuit 42 and no longer contribute to closing the circuit of the field lines of the permanent magnets 43. The retaining member 7 no longer enjoys the effect of the magnetic field and is no longer retained. A spring may contribute to moving the retaining member 7. The retaining member 7 is in the movement configuration P2'.

Figure 12:
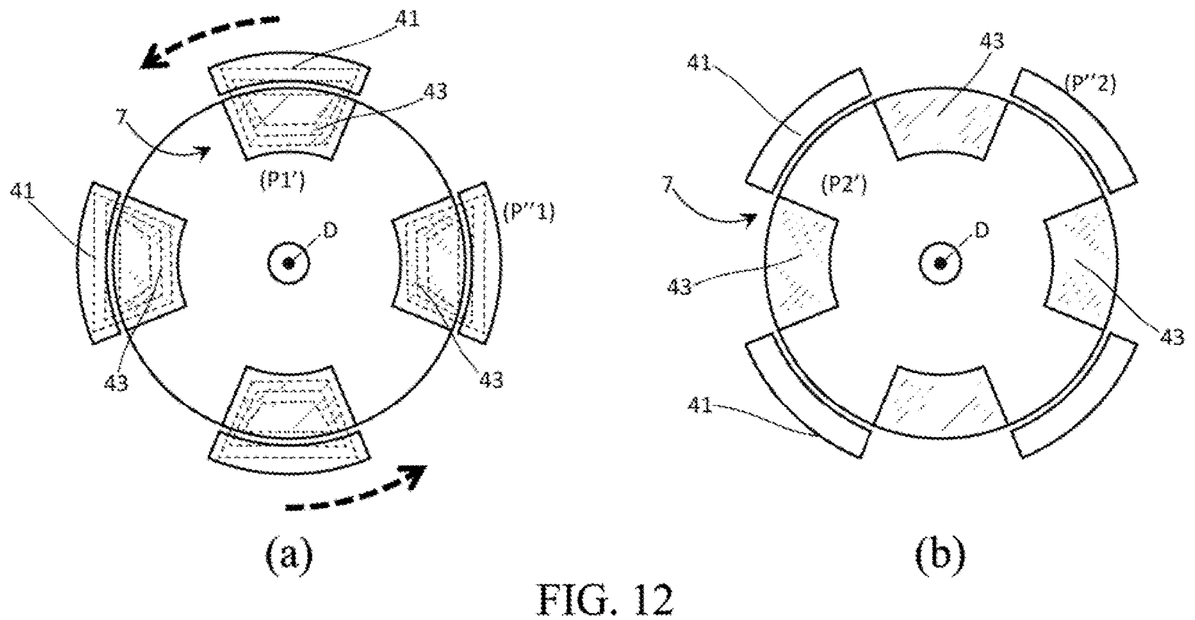
FIG. 12 is a partial schematic depiction of a seventh embodiment of the invention.
Figure 13:
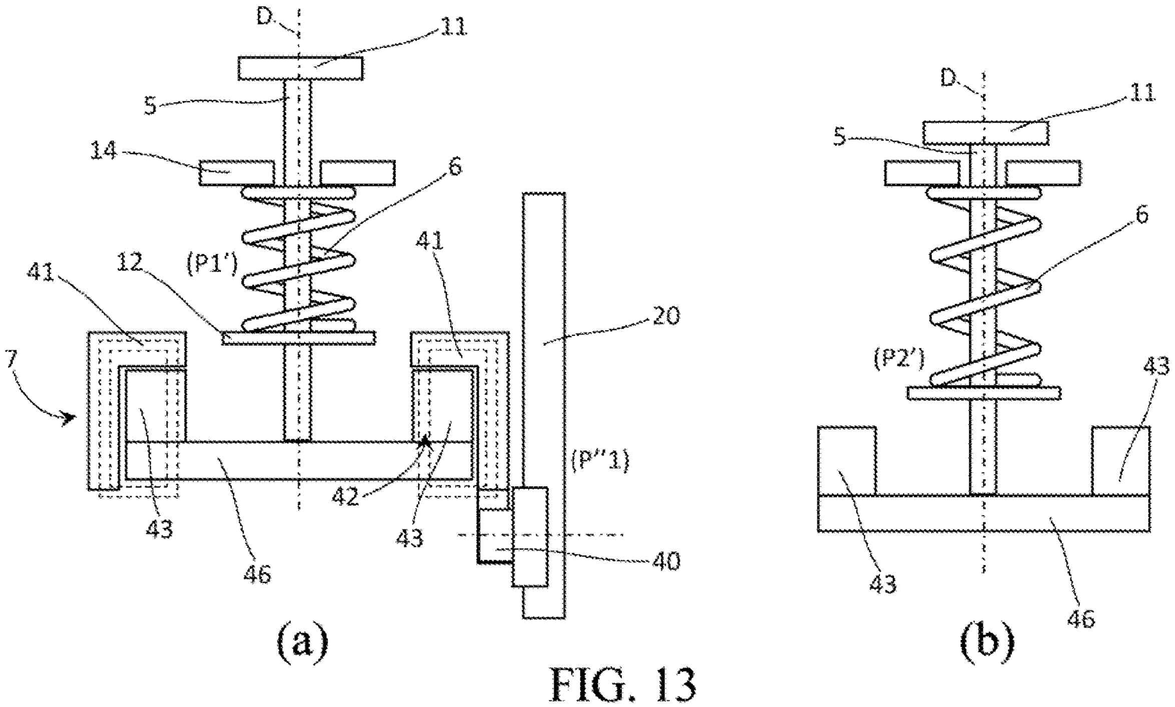
FIG. 13 is another partial schematic depiction of the seventh embodiment of the invention.

FIGS. 12 and 13 illustrate a seventh embodiment. The views in FIG. 12 are views from above. The views in FIG. 13 are side views. Part (a) of FIG. 12 and part (a) of FIG. 13 schematically indicate the retaining member 7 in the first position P1' in which the elastic return means 6 is immobilized. Part (b) of FIG. 12 and part (b) of FIG. 13 schematically indicate the retaining member 7 in the second position P2' in which the elastic return means 6 is no longer retained.

In this seventh embodiment, the elastic return means 6 for the elastic return of the mobile electrode 5 is retained only by magnetic forces. A magnetic component 41, connected to the main switch 20, is rotationally mobile. The kinematics of the connection between the main switch 20 and the magnetic component 41 have not been detailed and have not been depicted in part (b) of FIG. 13. In the example illustrated, the magnetic component 41 comprises four permanent magnets 43. FIG. 12 schematically indicates the rotational movement of the magnetic component 41. A support piece 46 is rigidly connected to the permanent magnets 43 and to the mobile electrode 5. The support piece 46, the mobile component 41 and the permanent magnets 43 may form a magnetic circuit 42. The support piece 46 and the mobile component 41 both contribute to closing the circuit of the field lines of the permanent magnets 43. The support piece 46 is also connected to the spring 6.

In the position illustrated in part (a) of FIG. 12, each permanent magnet 43 faces a portion of the magnetic component 41. The field lines are thus closed into a circuit, ensuring a retaining force retaining the support piece 46. The magnetic characteristics in the various elements of the magnetic circuit 42, and the magnitude of the air gap are chosen so that the retention force of the support piece 46 is higher than the force exerted by the spring 6.

The position illustrated in part (b) of FIG. 12 corresponds to a rotation of the magnetic component 41 through one eighth of a turn. In this position, the permanent magnets 43 no longer face the element 41 and the closing of the circuit of the magnetic field lines is negligible. There is no longer any retaining force retaining the support piece 46, and the spring 6 causes the mobile electrode 5 to move, and thus causes the contact 3 to open.

In this embodiment, the movement of the main switch 20 causes the release of the elastic return means 6 without the need for an electrical control.

According to another aspect of the invention, the main switch 20 is configured to cause the mobile electrode 5 to move into the position of closure of the vacuum interrupter 2. The main switch 20 is thus configured to cause the elastic return means 6 to move into a position in which the potential energy of the elastic return means 6 is greater than or equal to the potential energy corresponding to the retention configuration P1'. The main switch 20 is also configured to move the retaining member 7 into its retention configuration P1 when the main switch 20 moves from the position P2" preventing current from passing in the main circuit 30 to the position P1" allowing current to pass in the main circuit 30.

In other words, the movement of the main switch 20 towards the position P1" in which current can pass in the main circuit 30 allows the switching system 50 to be reset. The elastic return means 6 and the retaining member 7 both return to their initial position. The vacuum interrupter 2 is thus ready for a subsequent operation of switching off the current in the main circuit 30.

For that, the switching system 50 comprises a pivoting link rod, not illustrated, configured to cause the elastic return means 6 to move into a position in which the potential energy of the elastic return means 6 is greater than or equal to the potential energy corresponding to the retention configuration P1' when the main switch 20 moves from the position P2" preventing current from passing in the main circuit 30 to the position P1" that allows current to pass in the main circuit 30. In the example illustrated in which the return means 6 is a spring, the spring 6 is compressed to a length identical to the length corresponding to the retention configuration P1', and the retaining member 7 is placed back in the retention configuration P1'. The spring 6 may also be compressed to a length shorter than the length corresponding to the retention configuration P1', corresponding to greater potential energy, so as to prevent the spring 6 from applying stress to the retaining member 7 and thus make it easier for the retaining member 7 to be put back in the retention configuration P1'.

The invention claimed is:

1. A switching system for switching an electrical device, comprising:

- a vacuum interrupter comprising:
  - a fixed electrode,
  - a mobile electrode, configured to move between:
    - a first position, known as the closed position, in which the fixed electrode and the mobile electrode are in contact with one another so as to allow electrical current to pass, and
    - a second position, known as the open position, in which the fixed electrode and the mobile electrode are separated from one another so as to prevent electrical current from passing,
- an elastic return means configured to apply a driving force to the mobile electrode,
- a retaining member for maintaining the position of the elastic return means, the retaining member being configured to move:
  - from a first configuration, known as the retention configuration, in which the elastic return means is immobilized, into
  - a second configuration, known as the movement configuration, in which the elastic return means is released, the switching system being configured so that the mobile electrode moves from the closed position to the open position under the action of the elastic return means when the retaining member leaves its retention configuration, the switching system comprising a main switch of the electrical device, wherein the main switch is able to move between a first position allowing electrical current to pass in a main electric circuit and a second position preventing electrical current from passing in the main electric circuit, and wherein the main switch is configured so that the retaining member leaves its retention configuration when the main switch moves from the first position allowing electrical current to pass to the second position preventing electrical current from passing, and wherein the retaining member is configured to move from the retention configuration to the movement configuration under the action of a magnetic component connected to the main switch.

2. The switching system according to claim 1, comprising a mobile cup able to move under the action of the elastic return means, wherein the mobile electrode comprises a rod extending along an axis and a blade secured to the rod, and wherein the mobile cup is configured to drive the blade.

3. The switching system according to claim 2, wherein the elastic return means comprises a spring and wherein the spring is compressed between a fixed wall of the switching system and the mobile cup.

4. The switching system according to claim 2, wherein the mobile cup comprises an orifice through which the rod of the mobile electrode passes and wherein the mobile cup comprises a disc-shaped first portion, and an annulus-shaped second portion, the first portion and the second portion extending transversely with respect to an axis, and a cylindrical third portion extending along the axis, the third portion connecting the first portion and the second portion, wherein the first portion comprises the orifice.

5. The switching system according to claim 1, wherein the retaining member is mounted with the ability to pivot about a pivot.

6. The switching system according to claim 1, wherein the retaining member is mounted with the ability to pivot, and wherein the main switch of the main circuit is connected to a control element which comprises a thrust zone configured to press against the retaining member so as to cause the retaining member to pivot away from its retention position.

7. The switching system according to claim 1, wherein the retaining member is configured to move from the retention configuration to the movement configuration under the action of an electromagnet.

8. The switching system according to claim 7, comprising a mobile magnetic element kinematically connected to the main switch of the main circuit, the magnetic element being configured to cause a magnetic flux to circulate in a control circuit controlling the electromagnet, the electromagnet being configured to cause the retaining member to move from the retention configuration to the movement configuration in response to a movement of the mobile magnetic element.

9. The switching system according to claim 8, wherein the main switch of the main circuit is configured to electrically power a control circuit controlling the electromagnet, the electromagnet being configured to cause the retaining member to move from the retention configuration to the movement configuration in response to the supply of electrical power received from the main switch.

10. The switching system according to claim 9, wherein the control circuit controlling the electromagnet is electrically powered by the main circuit of the electrical device.

11. The switching system according to claim 1, wherein the retaining member comprises a permanent magnet configured to apply a magnetic force to a magnetic blade connected to the mobile electrode, and wherein the retaining member comprises an electromagnet configured to apply a magnetic field opposite to a magnetic field generated by the permanent magnet.

12. The switching system according to claim 1, wherein the magnetic component is a permanent magnet configured to drive the retaining member.

13. The switching system according to claim 1, wherein the magnetic component is a magnetic core configured to channel a magnetic field in a magnetic circuit.

14. The switching system according to claim 1, wherein the main switch is configured to cause the mobile electrode to move into the position in which the vacuum interrupter is closed, is also configured to cause the elastic return means to move into a position in which the potential energy of the elastic return means is greater than or equal to the potential energy corresponding to the retention configuration, and is also configured to move the retaining member into its retention configuration when the main switch moves from the position preventing the current from passing in the main circuit to the position that allows the current to pass in the main circuit.

15. An electrical device comprising:

the switching system according to claim 1, wherein the vacuum interrupter is arranged in parallel with the main switch of the electrical device.

* * * * *